United States Patent
Ferrari

(10) Patent No.: US 7,623,556 B2
(45) Date of Patent: Nov. 24, 2009

(54) DEVICE FOR MULTIPLYING OPTICAL FREQUENCIES

(76) Inventor: Gabriele Ferrari, via Ferrero, 54, 50027 Strada in Chianti (Firenze) (IT)

( * ) Notice: Subject to any disclaimer, the term of this patent is extended or adjusted under 35 U.S.C. 154(b) by 156 days.

(21) Appl. No.: 11/663,705

(22) PCT Filed: Sep. 23, 2005

(86) PCT No.: PCT/IT2005/000546

§ 371 (c)(1),
(2), (4) Date: Mar. 24, 2007

(87) PCT Pub. No.: WO2006/033133

PCT Pub. Date: Mar. 30, 2006

(65) Prior Publication Data

US 2008/0055702 A1 Mar. 6, 2008

(30) Foreign Application Priority Data

Sep. 24, 2004 (IT) .............................. FI2004A0199

(51) Int. Cl.
*H01S 3/10* (2006.01)
(52) U.S. Cl. .............................. 372/21; 372/22; 372/28
(58) Field of Classification Search ................... 372/21, 372/22
See application file for complete search history.

(56) References Cited

U.S. PATENT DOCUMENTS 5,068,546 A * 11/1991 Hemmerich et al. ........ 359/328

(Continued)

FOREIGN PATENT DOCUMENTS

EP 0767396 A2 4/1997

(Continued)

OTHER PUBLICATIONS

Ikegami et al., "Accuracy of an optical parametric oscillator as an optical frequency divider", *Optics Communications*, North-Holland Publishing Co., Amsterdam, The Netherlands, vol. 127, No. 1, Jun. 1, 1996, pp. 69-72, XP004007489, ISSN: 0030-4018 (see Fig. 1, whole document).

(Continued)

*Primary Examiner*—Dung T Nguyen
(74) *Attorney, Agent, or Firm*—Pollack, P.C.

(57) ABSTRACT

An optical cavity is combined with non-linear optical crystals and a laser source to generate light radiation at a frequency about 1.5 times the frequency of the initial laser source while having a wavelength 2/3 that of the initial laser source. The optical cavity comprises mirrors of relatively high reflectivity for optical radiation at a frequency of F/2, superior transmission for radiation at a frequency of 3/2*F to extract the final radiation and mirrors with relatively immediate or high reflectivity, or generally high transmission for radiation at a frequency F. The effective optical length of the cavity is precisely tunable by operating at least one of the mirrors that form the cavity. The optical cavity houses at least two non-linear optical crystals: at least one of which satisfies the phase-matching—quasi phase-matching—condition for non-linear conversion F 2*F/2, and at least one of which satisfies the phase-matching—or quasi phase-matching—condition for non-linear conversion F+F/2↔3/2*F The length of the optical cavity, and its resonance modes, are actively stabilized such that the only process of frequency division is that by a factor of around 2.

20 Claims, 1 Drawing Sheet

U.S. PATENT DOCUMENTS

| | | | |
|---|---|---|---|
| 5,500,865 A | 3/1996 | Chakmakjian et al. | 372/12 |
| 5,894,489 A | 4/1999 | Haldorsson et al. | 372/23 |
| 6,219,363 B1 | 4/2001 | Fix et al. | 372/22 |
| 2002/0122455 A1 | 9/2002 | Knights et al. | 372/108 |
| 2003/0112492 A1 | 6/2003 | Huang | 359/321 |
| 2006/0050748 A1* | 3/2006 | Sumiyoshi et al. | 372/21 |
| 2006/0176916 A1* | 8/2006 | Zanger et al. | 372/28 |

FOREIGN PATENT DOCUMENTS

| | | | |
|---|---|---|---|
| WO | WO 0190812 A1 | 11/2001 | |
| WO | WO 2004003653 A1 | 1/2004 | |
| WO | WO 2006033133 A3 | 3/2006 | |

OTHER PUBLICATIONS

Garashi et al., "Continuous-wave optical parametric oscillator based on periodically poled $KTiOPO_4$", *Optics Letters*, OSA, Optics Society of America, Washington, DC, USA, vol. 23, No. 22, Nov. 15, 1998, pp. 1739-1741, XP000802115, ISSN: 0146-9592 (see Fig. 1, whole document).

* cited by examiner

DEVICE FOR MULTIPLYING OPTICAL FREQUENCIES

FIELD OF THE INVENTION

The present invention concerns the field of laser sources and of the relative optical frequency conversion systems. More specifically, the invention refers to a method and a device for optical frequency multiplication by a factor 1.5.

BACKGROUND OF THE INVENTION

In high precision spectroscopy and laser cooling of atomic Lithium vapors, a laser source or "pumping laser" is typically required ideally having the following specifications: power within a range of hundreds of mW; relatively continuous wave radiation (i.e., not pulsed), with generally low amplitude noise; a frequency tunable over a number of Ghz at a wavelength corresponding generally to the atomic resonance of Lithium (671 nm); a relatively small spectral linewidth relative to 6 MHz (6 MHz being the natural linewidth of atomic transition); a single transverse mode, such as Gaussian, with an M2 lower than at least about 1.5, that ensures at least around a 50% coupling efficiency for a single transverse mode optical fiber; a relatively low cost; simple operation, an efficiency generally stable and reliable for at least a few months of regular use; and a power dissipation of not higher than a few kW.

Although there are many optical conversion systems in the art, none fully satisfies the "ideal" requirements, as set forth above, for high precision spectroscopy and laser cooling of atomic Lithium vapors. In the case of conventional semiconductor-type laser sources, the associated laser diodes have been found suitable for operating in a neighborhood of 671 nm, and supplying power up to between about 5 W and about 10 W. These relatively high power diodes have an emission spectrum that is many THz wide, and their spatial beam profile is multimode. To satisfy the desired criteria of the spectral linewidth and beam profile mode, however, low power laser diodes (20 mW maximum power) stabilized on extended cavity in the Littrow, or Littman-Metcalf configuration, must be used. With these configurations, the maximum available power is about 50% of the initial power from the diode laser. Hence, the total power obtainable is no more than about 10 mW. Generally speaking, it is possible to amplify low power radiation with good spectral properties through injection locking of slave laser diodes, or by use of seeding semiconductor tapered amplifiers (See, e.g., "A high-power multiple-frequency narrow-linewidth laser source based on a semiconductor tapered amplifier", G. Ferrari et al., Optics Letters 24, 151 (1999)). Notwithstanding, by using a laser diode as slave a amplifier, it is possible to achieve no more than about 20 mW, semiconductor tapered amplifiers for a wavelength lower than approximately 730 nm being ready available on the market.

Another conventional laser source is the dye laser. Dye lasers, at least theoretically, represent a viable alternative, particularly in terms of their flexibility of use. By varying the type of dye used and wavelength of the pumping laser, it is possible to generate radiation having an emission wavelength ranging from infrared to ultraviolet. In the case of 671 nm radiation, it is possible to generate such radiation using systems on the market, for instance, the Coherent 699 Dye Laser, with Rhodamine dye. By this combination, the pumping laser must have an emission wavelength generally within a range of 500 nm and 550 nm, for which the most common choice is an Argon ion (Ar+) laser, or a Neodymium or Ytterbium YAG laser having a frequency doubling stage (515 nm or 532 nm). While useful, the efficiency of the Argon ion (Ar+) laser is considered rather low (about 0.1%), hence to generate power within a range of a few Watts, it is necessary to dissipate many kW of energy. Also, this laser has been found very unreliable, typically has a non-negligible amplitude and pointing noise, and quite expensive both to purchase and maintain, requiring frequent realignment of the cavity. For these reasons, Argon ion lasers have not generally found widespread industrial application.

Alternatives to the Ar+ pumping laser include a frequency doubled Nd:YAG or Yb:YAG laser. These lasers have been found relatively reliable (normally requiring replacement of the pumping diode bars only every 10,000 working hours), and are quite efficient (e.g. to produce 10 W of radiation, the overall power consumption, even after taking into account the Nd/Yb:YAG bar cooling system, is typically only around 1 kW). While dye lasers also meet the precision spectroscopy and laser cooling criteria for output power, spectral purity, and spatial mode, they are not only expensive, but can also be complicated to operate.

Another option is a Titanium-Sapphire (Ti:Sa) laser. These lasers not only have spectral characteristics and working conditions similar to those of dye lasers for 671 nm, but also have much greater simplicity of operation. While useful, the Ti:Sa gain curve is centered at around 850 nm, and their application at 671 nm (on the tail of the gain profile) is not considered efficient. Moreover, the cost of a Ti:Sa laser, like a dye laser, is relatively high.

Since there are no known laser sources emitting directly at the required wavelength, both at an acceptable cost and in a fully satisfactory manner of operation, laser sources may also be considered that rely on non-linear frequency conversion, such as Second Harmonic Generation (SHG), Frequency Sum, and Optical Parametric Oscillator (OPO).

Second Harmonic Generation is a conversion process that effectively doubles the frequency of radiation, by sending the fundamental radiation through a crystal that is non-linearly polarizable and simultaneously satisfies the phase-matching conditions (or quasi-phase-matching, if periodically poled crystals are used) between the fundamental radiation and that generated via the Second Harmonic Generation process. Currently, there are non-linear crystals available that are considered well-suited for Second Harmonic Generation toward the complete visible spectrum, near ultraviolet, and near infrared, are available. More specifically, crystals are available that generate about 671 nm light from 1342 nm. Hence, the pumping laser must still deliver at least around 1 W at about 1342 nm, as well as suitable spectral purity, frequency tunability and spatial mode quality. Although semiconductor sources deliver up to few tens of mW of power, amplifiers (e.g., Raman fiber amplifiers) are considered unsuitable for generating radiation having a linewidth lower than about 1 Ghz. Another possible alternative is the Neodymium Vanadate laser. Unfortunately, however, these lasers are not available in a continuous wave (CW) version, and do not satisfy the criteria of frequency tunability.

Frequency Sum is a process where two distinct base photons, each having a different frequency, are combined or added together so as to generate a single photon, the frequency of which is the sum of the frequencies of the two base photons. For applications at 671 nm, a laser at one micron may be used (like a laser diode stabilized on an extended cavity) that is amplified up to about 5 W on a Yb fiber amplifier, and about a 2 micron laser (i.e., a laser diode amplified on a Thulium fiber amplifier, up to around 10 W available). Although this provides power that may be rather high for efficient non-linear conversion, an optical cavity must be used that is doubly resonant with radiation at about 1 and 2 microns. While this is not problematic for radiation at approximately 1 micron, problems may arise with radiation at around 2 microns, principally due to a lack of detectors (i.e., for optical alignment, and making the radiation resonant with one of the cavity modes) efficient at this wavelength. In addition, this solution requires that both lasers be summed or combined in order to fulfill the requirements of spectral purity, power, and spatial mode quality, thereby doubling of the complexity of the laser source.

As for the Optical Parametric Oscillator (or OPO), it is a device that, beginning at a laser field of frequency f1, produces two fields having frequencies of f2 and f3, respectively, such that f2+f3=f1. The OPO essentially comprises an optical cavity housing a non-linear crystal that satisfies the conditions of phase-matching, or quasi-phase-matching, for the process f1 ↔ f2+f3. The starting laser having a frequency f1 is referred to as the "pump". If the frequency f2 is higher than f3, then f2 is called the "signal" and f3 the "idler". An OPO is known as singly resonant when the optical cavity is resonant with one field ("signal" or "idler"), doubly resonant when the resonance is both with the "signal" and "idler", and triply resonant when the pump is resonant with the "signal" and "idler" as well. The simplest method for generating 671 nm radiation with an OPO begins with a "pump" at a frequency higher than about c/671 nm=446 THz, thereby directly producing around 671 nm. Beginning with a "pump" at 532 nm, then combining the same with a "pump" at 671 nm, radiation at approximately 2568 nm is produced.

Realistically, an OPO of this sort would be singly resonant with an operating threshold of pumping laser power at around 2-3 W (an arrangement of this general description is disclosed, for instance, in "Continuous-wave singly-resonant optical parametric oscillator based on periodically poled LiNbO3", Bosenberg et al., Optics Letters 21, 713 (1996)). Because spectral characteristics of the radiation so generated depend substantially on experimental conditions, it is conceivable to achieve at least some of the precision spectroscopy and laser cooling requirements described previously, namely, producing around 100 mW of radiation at about 671 nm using a 10 W pumping laser at around 532 nm. To achieve this, it is apparent that a relatively powerful, 532 nm pumping laser must be employed, albeit with associated relatively high cost. Considering the power available from these systems, the intrinsic frequency instability (which depends generally on the stability of the cavity, the crystal, and the pumping laser), and the overall cost, even this solution is not considered satisfactory, at least realistically, for industrial application.

A last option in the art is a variation of the above-described OPO, namely, an optical parametric oscillator in combination with other non-linear processes such as Frequency Sum or Second Harmonic Generation. This approach seeks to combine the flexibility of the wavelength generated by the OPO with processes of frequency duplication of the generated field (i.e., Second Harmonic Generation), or Frequency Sum, with the pump field (see, e.g., "Frequency up conversion by phase-matched sum-frequency generation in an optical parametric generator", E. C. Cheung et al., Optics Letters 19, 1967 (1994)). Despite the advantage of generating radiation of relatively higher frequency, these systems have similar features to and, thus, the disadvantages of, traditional OPOs. Accordingly, this approach has also been found unsatisfactory for applications at around 671 nm.

OBJECTS AND SUMMARY OF THE INVENTION

Accordingly, it is an object of the present invention to provide a device for generating laser radiation at wavelengths relatively close to the optical transition of atomic lithium (about 671 nm), while providing a laser source powered in a range of hundreds of mW, relatively continuous wave radiation with generally low amplitude noise, a frequency tunable by a number of GHz at a wavelength corresponding generally to the atomic resonance of Lithium (about 671 nm), a relatively small spectral linewidth relative to the natural linewidth of the atomic transition, a single transverse mode, such as Gaussian, with an M2 lower than at least about 1.5 that ensures at least around a 50% coupling efficiency for a single transverse mode optical fiber, a relatively low cost, simple operation, an efficiency generally stable and reliable for at least a few months of regular use, and a power dissipation not higher than a few kW.

Another object of the present invention is to provide device for generating laser radiation at wavelengths that are relatively close to the optical transition of atomic lithium (about 671 nm) that attains such a high operative efficiency as to permit laser sources to be used that are relatively inexpensive in terms of power requirements and overall output spectral properties.

According to one aspect of the present invention, a frequency multiplier device is provided, the device having, or being associated with, a laser source of a selected pump radiation at a frequency F, the device further including a ring optical cavity and a non-linear optical member oriented in the cavity. The optical member comprises a first optical member for satisfying a phase-matching or quasi-phase matching condition for the degenerate non-linear conversion F↔2*F/2, and a second optical member for satisfying a phase matching condition for the non-linear conversion F+F/2↔3/2*F. The cavity includes a plurality of mirrors having a relatively high reflectivity at least for the radiation at frequency F/2, and suitable for extracting radiation from the cavity at a frequency 3/2*F, a device further being provided for actively stabilizing the length of the cavity and its resonance modes such that the cavity is operated stably in a degenerated condition.

In accordance with another aspect of the present invention, an optical cavity is combined with a non-linear optical member and a laser source so as to generate light radiation at a frequency that is approximately 1.5 times the frequency F of the initial laser source, and which is at a wavelength 2/3 that of the initial laser source. The optical cavity preferably comprises a plurality of mirrors having a relatively high reflectivity for optical radiation at a frequency F/2, relatively good transmission for radiation at a frequency 3/2*F for extracting the final radiation and, according to the configuration of the device, mirrors with generally intermediate or relatively high reflectivity, or high transmission for radiation at a frequency F. The effective optical length of the cavity is precisely tunable operating at least one of the mirrors that form the cavity. The optical cavity houses at least two non-linear optical members: at least one satisfying a phase-matching condition for the non-linear conversion F↔2*F/2, and at least one satisfying a phase-matching condition for the non-linear conversion F+F/2↔3/2*F. The length of the optical cavity, and its resonance modes, are actively stabilized such that the only process of frequency division is that by a factor of around 2.

BRIEF DESCRIPTION OF THE DRAWINGS

Further features and/or advantages of the method and device according to the present invention will be made clearer by the following description of one of their embodiments, given by way of a non-limiting example, with reference to the accompanying drawings in which.

The same numerals are used throughout the drawing figures to designate similar elements. Still other objects and advantages of the present invention will become apparent from the following description of the preferred embodiments.

DETAILED DESCRIPTION OF THE PREFERRED EMBODIMENTS

Figure 1:
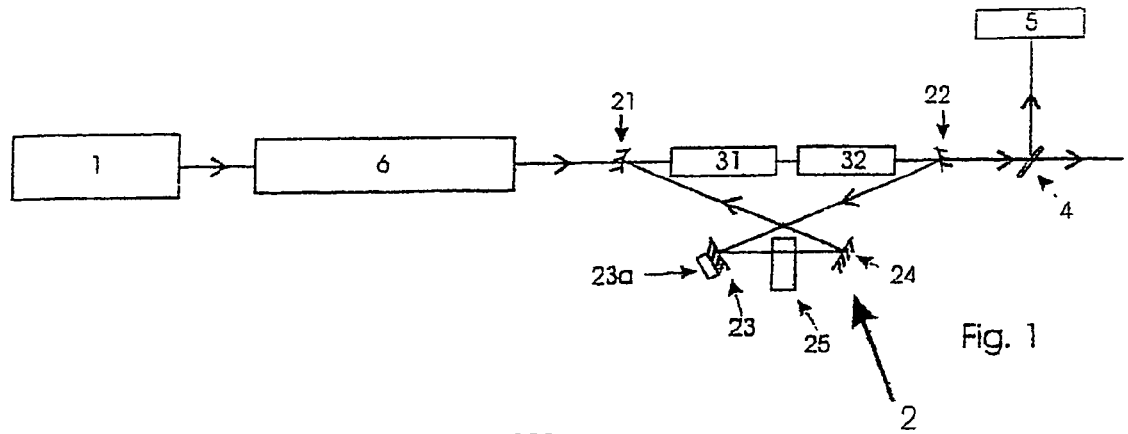
FIG. 1 represents an exemplary diagram of the configuration of a first embodiment of the device according to the present invention.
Figure 2:
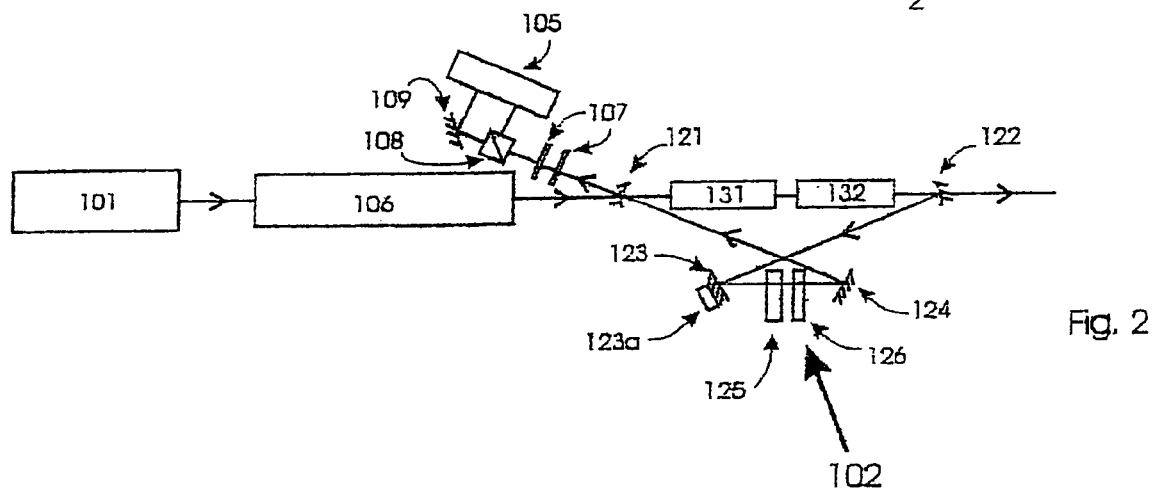
FIG. 2 represents an exemplary diagram of the configuration of a second embodiment of the device according to the present invention.
Figure 3:
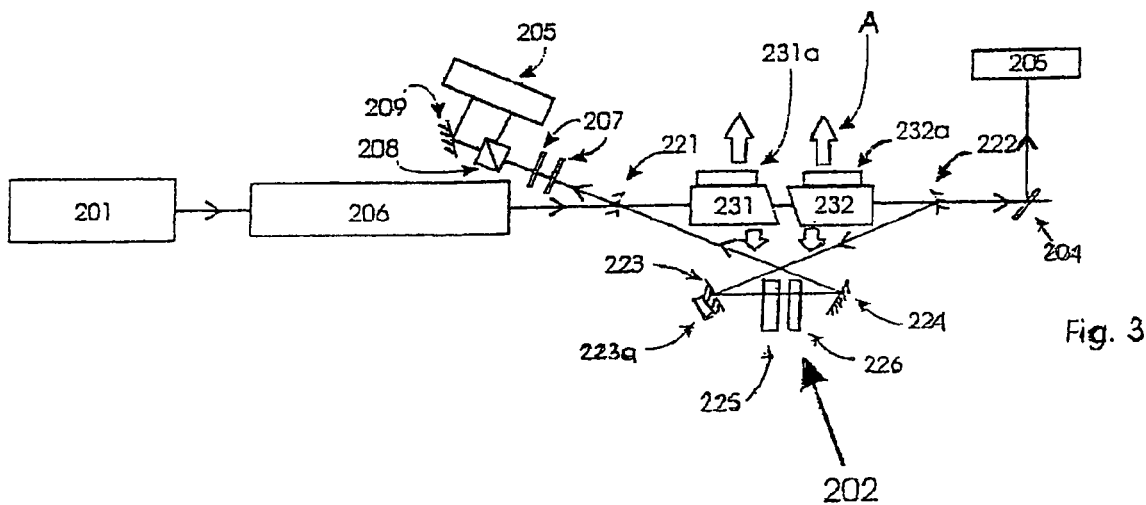
FIG. 3 represents an exemplary diagram of the configuration of a further embodiment, partially alternative to the embodiment in FIG. 2, of the device according to the present invention.

Referring now to the drawings and, more particularly, to FIGS. 1-3, there is shown generally a specific, illustrative device for multiplying optical frequencies, according to various aspects of the present invention. In one embodiment, set forth in FIG. 1, a laser source or pumping laser 1 is provided which, assuming an objective of producing output radiation at about 671 nm wavelength, emits radiation at about 1006.5 nm, corresponding generally to a frequency F of about 297 THz. In this spectral region, diode lasers are available that are suitable for delivering up to about 100 mW, and optical fiber amplifiers for delivering up to about 5 W. By combining these two sources, it is now possible to obtain 5 W of radiation at around 1006.5 nm with the required spectral characteristics.

In one embodiment, the optical frequency multiplying device comprises a ring optical cavity 2 including a plurality of mirrors, e.g., mirrors 21-24, having a relatively high reflectivity for radiation at around 2013 nm (or, more generally, at a frequency of F/2), and with a relatively high transparency at about 1006.5 nm and about 671 nm, respectively, at frequencies of F and 3/2*F. Generally speaking, the high transparency with radiation at a frequency 3/2*F is considered necessary for extracting the desired radiation from the cavity. An analogous result may also be obtained by inserting a dichroic mirror into the cavity, such mirror being reflective for radiation at frequency 3/2*F, and generally transparent for the other wavelengths. The pumping radiation emitted by pumping laser or source 1 strikes a first mirror of cavity 21 (i.e., a pump incoupling mirror) after passing through beam-shaping optics, such as of a type known by those skilled in the art, as represented by block 6 in FIG. 1.

At least one of the mirrors, for instance, mirror 23 in FIG. 1, is preferably mounted on a piezoelectric transducer 23a ensuring a run of at least one wavelength at a frequency of F/2, and on a timeline sufficiently brief to compensate for acoustic noise on the cavity. Desirably, a plurality of crystals, e.g., a pair of non-linear crystals 31, 32, are located inside the cavity preferably, but not necessarily, close to a selected point of maximum localization of the cavity resonance mode.

A first crystal 31 typically satisfies the condition of phase-matching, or quasi-phase-matching, for the process represented by 1006.5↔2*2013 nm, and a second crystal 32 for the process 2013+1006.5↔671 nm. In general, all facets of the crystals are coated with an anti-reflective material at about 1006.5 and about 2013 nm. The output facet of crystal 32 is desirably coated with an anti-reflective material as well, also at approximately 671 nm. The non-linear crystals may comprise KTP (Potassium Titanyl Phosphate) periodically poled (PPKTP), LiNbO3 (LN) periodically poled (PPLN), or MgO:LiNbO3 (Magnesium-Oxide-Doped LN), both of a single-crystal type and periodically poled. Using these crystals, the conditions of quasi phase-matching may now be satisfied for both non-linear processes. In addition, transmission at all three wavelengths involved in the frequency conversion process is good, with the further advantage that polarizations of all of the fields is automatically linear and parallel.

Alternatively or concurrently, the length of the cavity is actively stabilized by operation of piezoelectric transducer 23a which supports mirror 23, such that operation of the cavity is relatively constant at the degenerate condition. Maintenance of the degenerate condition may be verified by an attendant, for instance, by checking transmission of the pumping laser through the cavity. Specifically, when the cavity is in the degenerate condition, the threshold of the OPO is generally lower and the pump depletion is substantially higher. Upon applying a relatively small modulation to the position of mirror 23 which is controlled by the piezo transducer, and introducing a phase measurement of the OPO pump transmission, a correction signal for the transducer may now be obtained such that the cavity length is kept relatively constant. Moreover, the locking signal of the cavity, as derived from its transmission signal (e.g., here at about 1006.5 nm) is obtained from the radiation at the output through a dichronic mirror 4, associated with a photo detector 5. Further in the alternative, it is possible to confirm that the radiation generated at about 671 nm or around 2013 nm is in a single longitudinal mode.

Referring now to another aspect of the present invention, shown generally in FIG. 2, optical cavity 102 is preferably configured such that the OPO is triply resonant. To this end, crystals 131, 132 essentially identical to those the embodiment described above, are located generally between mirrors 121-124, where mirror 121 is the incoupling mirror of the pumping laser. Although the incoupling mirror is again highly reflective at about 2013 nm, it also has a reflectivity of around 1006.5 nm selected so as to maximize impedance coupling of the pumping laser beam for coupling with the cavity. Desirably, the other three mirrors are highly reflective at about 1006.5 and around 2013 nm, and transparent at approximately 671 nm.

In one embodiment, the cavity is stabilized in resonance with the pump using a locking scheme such as that described by Haensch-Couillaud (see. e.g., B. Couillaud, and T W. Haensch, Opt. Comm. Vol 35, 441 (1981)), or by a scheme provided according to Pound-Drever-Hall (R. W. P. Drever et al., App. Phys B Vol 31, 97 (1983)). In the Haensch-Couillaud scheme, shown generally in FIG. 2, stabilization of the cavity in resonance with the pump at around 1006.5 is achieved by operation of piezo transducer 123a of mirror 123. A locking signal is obtained by analyzing the polarization of the pumping laser beam reflected by incoupling mirror 121, through retarding waveplates 107 (lambda ½, and ¼ at approximately 1006.5 nm, that is, at the wavelength of the pumping laser), a linear polarizer 108, and a differential photo detector 105. When losses in the cavity depend on the polarization, polarization of the radiation reflected by mirror 121 into detector 105 depends on the difference in frequency of the pump relative to the resonance modes of the cavity. Such system for polarization analysis may, therefore, provide a signal suitable for maintaining the cavity stably in resonance with the pumping laser field.

To provide polarization that is dependent on losses in the cavity, a polarizing element may be inserted into the cavity (like a plate at a Brewster angle). Alternatively, the losses induced by the non-linear crystals, namely, those which occur only for polarization that satisfies the condition for the phase-matched conversion, are exploited. This not only reduces the number of optical elements in the cavity, but also eliminates additional losses from the polarizing element. Generally speaking, it is unlikely that the polarizing element may work ideally for the pumping laser without inducing losses in radiation at around 2013 nm.

Stabilizing the cavity in resonance with the pumping laser does not generally guarantee that the degenerate condition for the OPO has been established. It is, therefore, necessary to separately tune the phase accumulated in the field at about 2013 nm upon one trip or cycle through the cavity. This may be accomplished, for instance, by adjusting the temperature, the alignment, or the length of crystals 131 or 132; provided, however, that the overall conversion efficiency is not affected. Optionally, as best seen in FIG. 2, an optical element, 126 may be added to the cavity instead, in order to change the phase of the field at about 2013 nm relative to that at around 1006.5 nm. Appropriate optical elements include, but are not limited to, an electro-optic crystal to which a suitable voltage is applied, or an optical plate, with an anti-reflective coating, at the two resonant wavelengths in that the relative optical path of the two fields may be altered by varying the angle of incidence, or plate thickness.

In accordance with yet another aspect of the present invention, illustrated generally in FIG. 3, the phase accumulated by the two resonant fields for a cycle through the cavity may be modified using non-linear crystals 231 and 232 which, instead of being cut, as is typically done, with parallel input and output facets, the crystals are cut so as to form a dihedral angle between the input and output facets. By displacing at least one of the crystals orthogonally (i.e., transversely) relative to the axis of the beams, as indicated by arrows A, the thickness of the crystal varies at the position where the beams pass, and correspondingly varies the relative phase of the two fields upon one cycle through the cavity.

Generally, the dihedral angle between the input and output facets of the crystal causes an angular deviation between the pumping laser beam at frequency F and the beam generated at frequency F/2, possibly reducing somewhat the efficiency of the triply resonant cavity. To compensate for angular separation, such as may be introduced by the dihedral-shaped non-linear crystal, it is preferred that both non-linear crystals be cut so as to form a dihedral angle between the input and output facets, and that the crystals be arranged such that the angular separation introduced by a first crystal is compensated for (or partially compensated for) by that of the second crystal. According to one arrangement, non-linear crystals 231 and 232 are made of the same material, such that the facets facing one another, i.e., the output and input facets, respectively, are cut according to identical and coherently slanting dihedrals, as illustrated in FIG. 3.

Transverse displacement of the crystals may be provided by a conventional mechanical system for relatively rough movement, and piezoelectric transducers 231a and 232a for relatively fine movement. The phase of the fields at frequencies F and F/2 is actively stabilized, for instance, by operation of piezo actuators 231a and 232a, introducing a modulation to the transverse position of at least one of the crystals, and synchronous measurement of pumping laser radiation F coupled with the cavity, synchronously measuring the radiation generated at a frequency of 3/2*F, or synchronously measuring the radiation generated at a frequency of F/2 via a suitable detector 205 using a dichronic mirror 204.

Turning now to still another aspect of the present invention, a method of relative phase stabilization of the two resonant fields provided using a crystal cut dihedrally, as described above, may also be accomplished using a non-dihedral crystal. More specifically, instead of only being displaced transversely, use of the non-dihedral crystal is accompanied by a composite movement, namely, translation orthogonally to the optical axis in combination with rotation about an axis orthogonal to the optical axis. In this manner, the optical path of the two fields through the crystal may also be varied.

Similarly, the degenerate working condition—as with the embodiment of FIG. 1 above—can be checked and maintained by monitoring transmission of the pumping laser through the cavity, or verifying that the radiation generated at about 671 nm, or approximately 2013 nm, is single longitudinal mode.

The relative phase variation between two mutually coherent optical fields, such as one field at a frequency F and another at a frequency F/2, or equivalently, one field at a frequency F and another at a frequency 2*F, may generally be applied to all processes of non-linear optical radiation generation where the conversion efficiency also depends on the use of resonant cavities. One example is the process of frequency tripling (2*F+F), or frequency quadrupling (2*2*F), of a continuous wave laser at frequency F.

With continuous wave lasers, frequency doubling is performed in a resonant cavity to maintain the conversion efficiency at a relatively high value. In the case of frequency tripling, according to one embodiment, a plurality of cascaded non-linear crystals, e.g. two, are inserted into the cavity: a first one specific to frequency doubling from the fundamental field F+F↔2*F, and the second specific to the sum of the fundamental field with its second harmonic F+2*F↔3*F. As for frequency quadrupling, a plurality of cascaded non-linear crystals, e.g. two, are likewise inserted into the cavity: a first one specific to frequency doubling from the fundamental field F+F↔2*F, and the second specific to frequency doubling of the second harmonic generated by the first crystal 2*F+2*F↔4*F. In order to have an efficient overall process, it is considered important that both the fundamental field (frequency F) and the second harmonic field (frequency 2*F) be at an "intense" level. It is, therefore, advantageous that both fields be resonant simultaneously in the optical cavity.

As for frequency doubling using type-I crystals, while it is reasonable that the optical cavity housing the non-linear crystal be resonant simultaneously with the fundamental and second harmonic fields, this generally may not occur. Furthermore, if in the same doubling cavity a second crystal is inserted (for frequency doubling of the second harmonic, or sum of the fundamental and second harmonic), dispersion of the latter crystal, in general, prevents simultaneous resonance between the cavity, on the one hand, and the fundamental and second harmonic fields, on the other hand. For this reason, frequency quadrupling of continuous wave radiation is accomplished by cascading two frequency doublers, each comprising a resonant cavity that houses a specific non-linear crystal.

Analogous considerations apply to frequency tripling and quadrupling as well. More particularly, if, in the case of frequency doubling (F+F↔2*F), an element is added in the cavity for controlling the relative phase between the fundamental and second harmonic fields, then it is appropriate to:
- also introduces in the same cavity, a non-linear crystal specific to frequency quadrupling or frequency tripling beginning from the fields available in the cavity (2*F+2*F↔4*F or F+2*F↔3*F);
- choose mirrors for the cavity such that the cavity is resonant both with the fundamental and second harmonic fields;
- stabilize the length of the cavity such that it is resonant with the fundamental radiation, or stabilize the pumping laser such that it is resonant with one of the cavity modes; and
- stabilize the relative phase between the two fields such that the cavity is resonant with the fundamental and second harmonic fields simultaneously. In this manner, a field having a frequency three or four times that of the initial field may be produced, by employing only one optical cavity, simplifying considerably the equipment required.

Referring now to additional considerations relating to the device for frequency multiplication by 1.5, according to the present invention, the triply resonant configuration, it has been found, has additional advantages over the doubly resonant arrangement. First, the power threshold necessary for the pumping laser can be as low as about 1 mW. Hence, the overall efficiency of the triply resonant configuration is substantially greater. Second, the intensity of the pumping laser at the crystal level is higher, in turn, resulting in a significantly higher non-linear conversion efficiency. Finally, by locking the resonant cavity to the pumping laser, the relatively small amplitude modulation of the pumping laser transmission through the cavity (which is generally necessary to stabilize the cavity in the doubly resonant configuration) is avoided, thereby reducing the overall noise amplitude.

To improve the spectral characteristics of the radiation produced, it is preferred that a relatively thin etalon 25, 125, 225, shown in FIGS. 1-3, be positioned in the cavity which insures single mode operation of the OPO, even at relatively high pumping laser intensity, by operating only with radiation at around 2013 nm (through appropriate selection of surface treatment, reflective at about 2013 nm, and anti-reflective at approximately 1006.5 nm, in the triply resonant arrangement).

In accordance with another aspect of the present invention, an optical frequency multiplying device is provided wherein an optical cavity is combined with a non-linear optical member and a laser source so as to generate light radiation at a frequency approximately 1.5 times the frequency F of the initial laser source, and which is at a wavelength 2/3 that of the initial laser source. The optical cavity preferably comprises a plurality of mirrors having a relatively high reflectivity for optical radiation at a frequency of F/2, relatively good transmission for radiation at a frequency of 3/2*F for extracting the final radiation and, according to a particularly desirable configuration of the device, mirrors with generally intermediate or relatively high reflectivity, or high transmission for radiation at a frequency F.

It is preferred that the effective optical length of the cavity be precisely tunable by operation, e.g. adjustment, of at least one of the mirrors that form the cavity. The optical cavity houses at least two non-linear optical members: at least one satisfying a phase-matching condition for the non-linear conversion F↔2*F/2, and at least one satisfying a phase-matching condition for the non-linear conversion F+F/2↔3/2*F. The length of the cavity, and its resonance modes, are actively stabilized such that the only process of frequency division is that by a factor of around 2.

It is preferred that the non-linear crystal satisfies the condition for phase-matching type-I, type-II, or quasi-phase-matching, for division by a factor of about 2 of the pumping laser frequency. In the case of type-I or quasi-phase-matching, two photons are generated having the same polarization and, thus, being constructively identical. This process is commonly referred to as "degenerate frequency division". A process of this general description is disclosed, for instance, in an article entitled "Continuous-wave optical parametric oscillator based on periodically poled KTiOPO4" by A. Garashi et al. Optics Letters 23, 1739 (1998).

In the degenerate condition, the device is practically an OPO, being at least doubly resonant (i.e. having an identical "signal" and "idler"), which reduces the threshold operation to a few tens of mW. The efficiency is, therefore, automatically doubled as compared to conventional OPOs. This is because for each transformed photon of the pumping laser, two photons are generated at the final frequency, as opposed to one "signal" and one "idler" with traditional OPOs. The gain is also doubled and the operating threshold of the OPO is similarly reduced.

Hence, when operating in the degenerate condition, the efficiency of the OPO increases, with corresponding rise in power generated at frequency F/2, and associated greater power depletion for the pumping laser. In a "degenerate" OPO, it is theoretically possible to convert up to 100% of the initial power of the pumping laser into radiation at a frequency of F/2. According to one aspect of the present invention, the OPO is operated in a degenerate condition based on the signal derived upon varying the operating conditions of this configuration. In addition to being resonant at a frequency of F/2, the cavity may also be resonant at the pumping laser frequency F (i.e. a triple resonant OPO).

Overall, the device of the present invention advantageously generates laser radiation at wavelengths relatively close to the optical transition of atomic Lithium (671 nm), while providing a laser source powered in a range of hundreds of mW, relatively continuous wave radiation with generally low amplitude noise, a frequency tunable by a number of GHz at a wavelength corresponding generally to the atomic resonance of Lithium (about 671 nm), a relatively small spectral linewidth relative to the natural linewidth of the atomic transition, a single transverse mode, such as Gaussian, with an M2 lower than at least about 1.5 that ensures at least around a 50% coupling efficiency for a single transverse mode optical fiber, a relatively low cost, simple operation, an efficiency generally stable and reliable for at least a few months of regular use, and a power dissipation of not higher than a few kW.

More specifically, by the present invention, it is now possible to generate laser radiation in spectral regions difficult to access previously, particularly, but not exclusively, at a wavelength of about 671 nm, while satisfying all the requirements for high precision spectroscopy and laser cooling of atomic Lithium vapors, namely: use of laser sources that are simple to operate relative their spectral properties; relatively continuous wave radiation with generally low amplitude noise; frequency tunability over a number of GHz; a spectral width that is relatively small as compared to 6 MHZ; a single transverse mode with an M2 smaller than about 1.5; a relatively stable and reliable output for at least few months of operation; and power dissipation within a range of not higher than around 1 kW. Moreover, the device has a relatively elementary construction, is relatively simple to operate, and, hence, has a relatively low cost. The present invention is further beneficial in not only generating laser radiation at wavelengths relatively close to the optical transition of atomic lithium (about 671 nm), but also attains such a high efficiency of operation as to permit the use of laser sources that are relatively inexpensive in terms of power requirements and overall output spectral properties.

Aside from generating laser radiation at wavelengths that are difficult to access, the present invention is also useful for metrology of optical frequency, particularly because it establishes connections between distinct and different regions of the optical spectrum in a phase coherent manner. This, it has been found, has direct applications to optical frequency measurements, and phase stabilization of optical frequency counters.

Variations and/or modifications can be brought to the method and device for multiplying optical frequencies by a factor 1.5 according to the present invention, without for this reason departing from the protective scope of the invention itself.

What is claimed is:

1. A frequency multiplier device comprising, or associated with, a laser source of a pump radiation at a frequency F, the device including a ring optical cavity and a non-linear optical member oriented in the cavity, wherein the optical member comprises a first optical member for satisfying the phase-matching or quasi-phase matching condition for the degenerate non-linear conversion F2↔*F/2, and a second optical member for satisfying the phase matching condition for the non-linear conversion F+F/2↔3/2*F, the cavity comprising a plurality of mirrors having a relatively high reflectivity at least for the radiation at frequency F/2, and suitable for extracting from the cavity the radiation at frequency 3/2*F, a device being further provided for actively stabilizing the length of the cavity and its resonance modes so that the cavity is stably operated in a degenerated condition.

2. The device set forth in claim 1, wherein the mirrors are transparent at least for the radiation at frequency 3/2*F.

3. The device set forth in claim 1, wherein the cavity comprises an optical plate reflective for the radiation at frequency 3/2*F and transparent for the other wavelengths.

4. The device set forth in claim 1, wherein the cavity comprises an etalon device for acting only on the radiation at frequency F/2.

5. The device set forth in claim 1, wherein the non-linear optical member comprises first and second crystals with facets that are anti-reflection coated for radiation at frequencies F e F/2, the output facet of the second crystal being further anti-reflection coated for radiation at frequency 3/2*F.

6. The device set forth in claim 5, wherein the non-linear crystals are made of KTP (Potassium Titanyl Phosphate) periodically poled (PPKTP), or LiNbO3 (LN) periodically poled (PPLN), or MgO:LiNbO3 (Magnesium-Oxide-Doped LN), both single-crystal type and periodically poled.

7. The device set forth in claim 5, wherein the stabilizing device comprises at least one transducer supporting one of the mirrors of the cavity, ensuring operation of at least one wavelength at a frequency F/2, the transducer being controlled by a locking system of the cavity to a for radiation at a frequency F/2, the locking system comprising a device for detecting the amplitude of transmission of pump radiation from the cavity, or for detecting the amplitude of the radiation generated at 3/2*F.

8. The device set forth in claim 7, wherein the mirrors of the cavity are relatively high transparency mirrors for radiation at frequency F, whereby the cavity is configured for operation in a doubly resonant condition, the locking system comprising a dichroic mirror associated with a detector element oriented so as to be struck by output radiation from the cavity.

9. The device set forth in claim 7, wherein the mirrors of the cavity are relatively high reflectivity mirrors for radiation at frequency F, with the exception of the incoupling mirror, the reflectivity of which is selected so as to maximize impedance coupling of the pump radiation, whereby the cavity is configured for operation in a triply resonant condition, the locking system comprising a detecting element oriented so as to be struck by radiation reflected by the incoupling mirror of the cavity.

10. The device set forth in claim 9, wherein at least a retarding waveplate and a linear polarization member are arranged between the incoupling mirror and the detecting element.

11. The device set forth in claim 9, wherein the cavity includes a polarizing element such as a plate at a Brewster angle.

12. The device set forth in claim 9, wherein the cavity includes an optical element for changing the phase of the radiation at frequency F/2 relative to the phase of the radiation at frequency F.

13. The device set forth in claim 9, wherein at least one of the crystals is mounted so as to be displaceable orthogonally relative to the optical axis and/or rotatable about an axis orthogonal to the optical axis, for changing the phase of the radiation at frequency F/2 relative to the phase of the radiation at frequency F.

14. The device set forth in claim 9, wherein at least one of the crystals is associated with a device for varying the temperature to change the phase of the radiation at frequency F/2 relative to the phase of the radiation at frequency F.

15. The device set forth in claim 12, wherein in at least one of the crystals a dihedral angle is formed between the input facet and the output facet, the at least one dihedral crystal being mounted so as to be displaceable transversely, relative to the optical path of the beams, for phase tuning.

16. The device set forth in claim 15, wherein both crystals are dihedral-shaped, and oriented such that the angular separation between the radiation at frequency F and the radiation a frequency F/2 introduced by one of the crystals is at least partially compensated for by the other crystal.

17. The device set forth in claim 16, wherein the crystals include the same material, and have a radiation output facet and a radiation input facet facing one another, cut according to identical and coherently slanting dihedrals.

18. The device set forth in claim 13, where in movement of the at least one crystal is performed by a piezo transducer.

19. The device set forth in claim 13, further comprising a dichronic mirror associated with a detector element oriented so to be struck by output radiation from the cavity, for providing a measurement synchronous with the tuning of radiation F coupled with the cavity, of the radiation generated at 3/2*F, or of the radiation generated at F/2.

20. The device set forth in claim 7, wherein the at least one transducer supporting one of the mirrors is a piezo transducer.

* * * * *